United States Patent
Aguilar Ruelas

(10) Patent No.: US 10,160,363 B2
(45) Date of Patent: Dec. 25, 2018

(54) BABY CHANGING STATION FOR A MOTOR VEHICLE

(71) Applicant: FORD GLOBAL TECHNOLOGIES, LLC, Dearborn, MI (US)

(72) Inventor: Eduardo Arturo Aguilar Ruelas, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/131,435

(22) Filed: Apr. 18, 2016

(65) Prior Publication Data
US 2017/0295951 A1    Oct. 19, 2017

(51) Int. Cl.
| B60N 2/90 | (2018.01) |
| A47D 5/00 | (2006.01) |
| A47D 15/00 | (2006.01) |
| B60N 2/20 | (2006.01) |

(52) U.S. Cl.
CPC ............... *B60N 2/90* (2018.02); *A47D 5/006* (2013.01); *A47D 15/008* (2013.01); *B60N 2/206* (2013.01)

(58) Field of Classification Search
CPC ................................. A47D 5/006; B60N 2/206
USPC ....................... 297/188.07, 188.04, 238, 234
See application file for complete search history.

(56) References Cited

U.S. PATENT DOCUMENTS

| 2,555,659 | A | * | 6/1951 | Rose | B60N 2/3084 |
| | | | | | 297/118 |
| 3,094,354 | A | * | 6/1963 | Bernier | A47C 17/165 |
| | | | | | 297/112 |
| 4,541,654 | A | * | 9/1985 | Jonasson | B60N 2/20 |
| | | | | | 280/801.1 |
| 4,583,253 | A | * | 4/1986 | Hall | B60N 2/2854 |
| | | | | | 297/250.1 |
| 4,655,503 | A | * | 4/1987 | Kamijo | B60N 2/203 |
| | | | | | 297/103 |
| 5,716,091 | A | * | 2/1998 | Wieczorek | B60R 7/02 |
| | | | | | 224/275 |
| 5,722,724 | A | * | 3/1998 | Takei | B60N 2/3084 |
| | | | | | 297/114 |
| 5,788,324 | A | * | 8/1998 | Shea | B60N 2/462 |
| | | | | | 297/113 |
| 6,059,358 | A | * | 5/2000 | Demick | B60N 2/206 |
| | | | | | 297/125 |
| 6,327,726 | B1 | * | 12/2001 | Weber | A47D 5/006 |
| | | | | | 297/219.1 |

(Continued)

FOREIGN PATENT DOCUMENTS

| DE | 10138854 A1 | 2/2003 |
| JP | 11334434 A | 12/1999 |

OTHER PUBLICATIONS

English Machine Translation of DE10138854A1.
English Machine Translation of JP11334434A.

*Primary Examiner* — David E Allred
(74) *Attorney, Agent, or Firm* — Vichit Chea; King & Schickli, PLLC

(57) ABSTRACT

A baby changing station is provided for a motor vehicle. That baby changing station includes a car seat having a seat bottom and a seat back. A cavity is provided in a rear face of the seat back. A cover is carried on the seat back. That cover is displaceable between a first position covering and concealing the cavity and a second position opening the cavity. The baby changing station also includes a storage net carried on a first face of the cover.

4 Claims, 7 Drawing Sheets

(56) References Cited

U.S. PATENT DOCUMENTS

| | | | | |
|---|---|---|---|---|
| 6,390,260 B1* | 5/2002 | Roegner | A45C 3/00 | 190/1 |
| 6,702,375 B1* | 3/2004 | Laskowski | B60N 2/206 | 273/236 |
| 6,860,550 B2* | 3/2005 | Wojcik | B60N 2/206 | 108/44 |
| 7,188,896 B2* | 3/2007 | Embach | B60N 2/4876 | 297/188.01 |
| 7,438,356 B2* | 10/2008 | Howman | A47C 7/021 | 297/17 |
| 7,458,635 B2* | 12/2008 | Mendis | B60N 2/206 | 297/112 |
| 7,562,931 B2* | 7/2009 | Stojanovic | B60N 2/3013 | 296/24.4 |
| 7,611,183 B2* | 11/2009 | Burkey | B60N 2/206 | 296/37.15 |
| 7,797,774 B1* | 9/2010 | Beyert | A45C 9/00 | 5/417 |
| 8,657,356 B2* | 2/2014 | Pywell | B60N 2/36 | 224/275 |
| 8,657,371 B2* | 2/2014 | Matori | B60N 2/206 | 297/188.04 |
| 8,732,873 B2* | 5/2014 | Iskowitz | A47D 5/00 | 5/118 |
| 9,049,910 B1* | 6/2015 | Bakali | A45C 13/02 | |
| 9,204,951 B2* | 12/2015 | Brooks | A46B 15/0091 | |
| 2005/0225130 A1* | 10/2005 | Kobayashi | B60N 3/103 | 297/188.07 |
| 2007/0182230 A1* | 8/2007 | Bhatia | B60N 2/206 | 297/378.1 |
| 2008/0272630 A1* | 11/2008 | Sturt | B60N 2/64 | 297/188.07 |
| 2009/0114690 A1* | 5/2009 | Landay | A45C 7/0054 | 224/575 |
| 2010/0205747 A1 | 8/2010 | Iskowitz | | |
| 2011/0233951 A1* | 9/2011 | Zekavica | B60N 2/3013 | 296/24.34 |
| 2015/0130231 A1 | 5/2015 | Lindsay et al. | | |
| 2017/0156510 A1* | 6/2017 | Roberts Moosa | A47D 5/003 | |
| 2017/0291710 A1* | 10/2017 | Barr-Perea | B64D 11/0636 | |

\* cited by examiner

BABY CHANGING STATION FOR A MOTOR VEHICLE

TECHNICAL FIELD

This document relates generally to the motor vehicle equipment field and, more particularly, to a baby changing station for a motor vehicle that is integrated into a car seat of the motor vehicle so that it is readily accessed and easy to use when needed.

BACKGROUND

Invariably, parents traveling in a motor vehicle with a baby will need to stop the vehicle in order to change the diaper of the baby. When this situation occurs, there are generally two options. The first option is to search for a place with a bathroom that has a baby changing station or a place where you can lay the baby down to change the diaper. The second option is to change the baby in the vehicle. Both options have disadvantages.

Specifically, with regard to the first option, sometimes it is not possible to find a conveniently located bathroom with a baby changing table or an appropriate place outside the vehicle to lay the baby down for diaper changing due to inclement weather conditions or some other matter. With regard to the second option, changing a baby in a motor vehicle can be a difficult task due to several factors including, for example, motor vehicles typically do not include features designed to function as a baby changing station and limited room within the motor vehicle complicates the effort.

This document relates to a new and improved baby changing station that is directly integrated into a car seat of the motor vehicle. Advantageously, the baby changing station is specifically designed to function as a changing station thereby simplifying the task for the benefit of the concerned parent.

SUMMARY

In accordance with the purposes and benefits described herein, a baby changing station is provided for a motor vehicle. That baby changing station comprises a car seat including a seat bottom and a seat back. A cavity is provided in a rear face of the seat back. A cover is carried on the seat back. That cover is displaceable between a first position covering and concealing the cavity and a second position opening the cavity. In addition, a storage net is carried on a first face of the cover.

The baby station is further equipped with a restraining strap. The restraining strap is carried on the seat back and extends across the cavity and may be used to safely restrain a baby in the cavity during the diaper changing process. Advantageously, this frees both hands to remove a new diaper, wipes and any other needed supplies from the storage net in order to complete the baby changing operation.

In one possible embodiment, the cover comprises a first panel and a second panel. The first panel may be connected to the seat back by a first hinge and the second panel may be connected to the seat back by a second hinge. In one particularly useful embodiment, the first hinge is provided adjacent a first side of the seat back and a second hinge is provided adjacent a second side of the seat back so that the panels open in opposed directions and when opened, form extended sidewalls projecting from the seat back at opposing sides of the cavity.

The storage net may comprise a first net carried on the first panel and a second net carried on a second panel. The first and second nets may both be made from an elastic material. As a consequence, the first net forms a first expandable storage pocket accessible through a first access opening and the second net forms a second expandable storage pocket accessible through a second access opening.

Still further, the first face of the cover may be oriented toward the cavity when the cover is in the first position so that the first net and the second net are both concealed in the cavity when the cover is in the first, closed position.

In one possible embodiment, the baby changing station further includes a wedge cushion. That wedge cushion may be sized and shaped to nest in the cavity so that it and any and all baby changing items may be fully concealed from sight when the cover is closed. In contrast, when the cover is opened, the wedge cushion may be positioned in the cavity to help hold the baby in a desired position during the baby changing process.

In one particularly useful embodiment, the car seat incorporating the integrated baby changing station is a front passenger seat of the motor vehicle.

In the following description, there are shown and described several preferred embodiments of the baby changing station. As it should be realized, the baby changing station is capable of other, different embodiments and its several details are capable of modification in various, obvious aspects all without departing from the baby changing station as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the baby changing station and together with the description serve to explain certain principles thereof. In the drawing figures.

Reference will now be made in detail to the present preferred embodiments of the baby changing station, examples of which are illustrated in the accompanying drawing figures.

DETAILED DESCRIPTION

Figure 1:
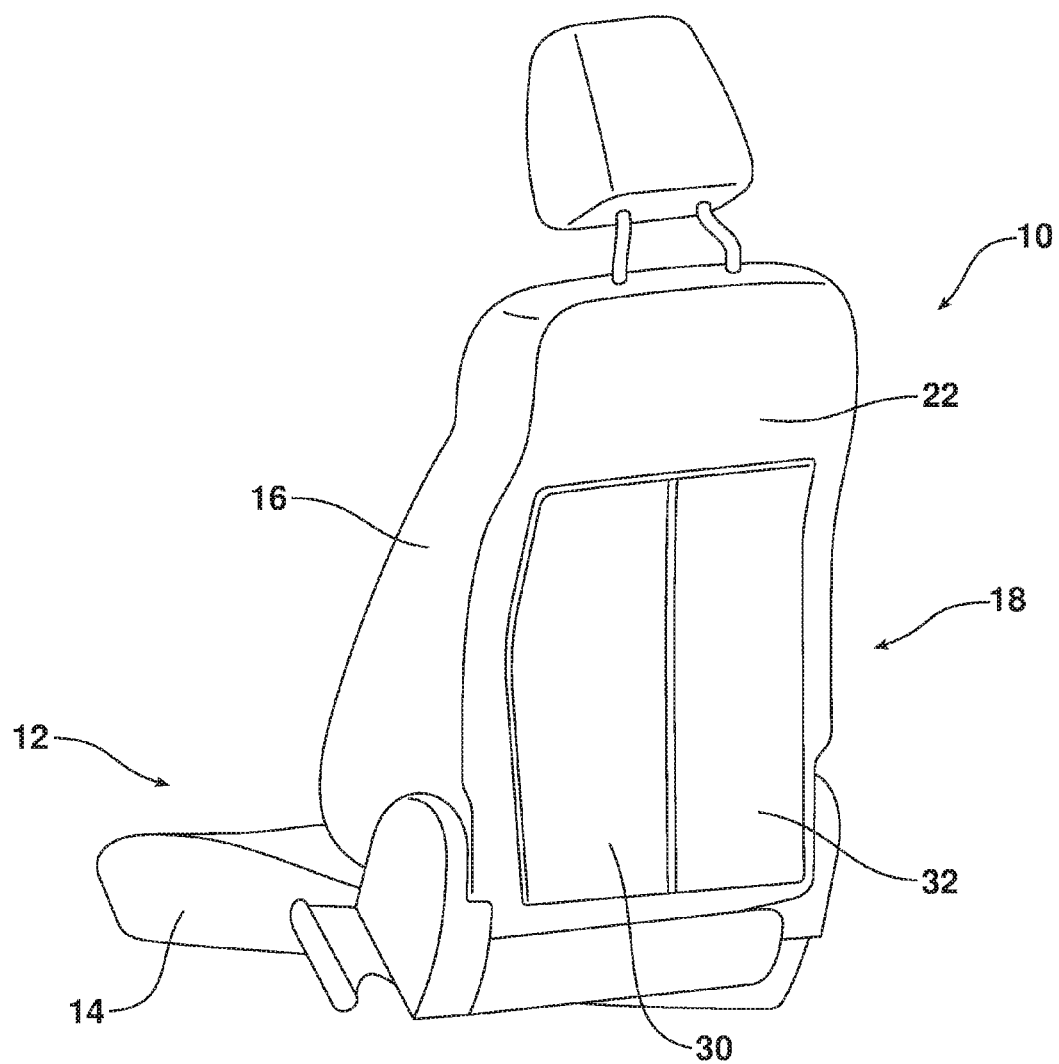
FIG. 1 is a rear elevational view of the baby changing station showing the car seat and integral baby changing station with the cover in the closed position so as to conceal the baby changing station and all items utilized to change the baby.
Figure 1A:
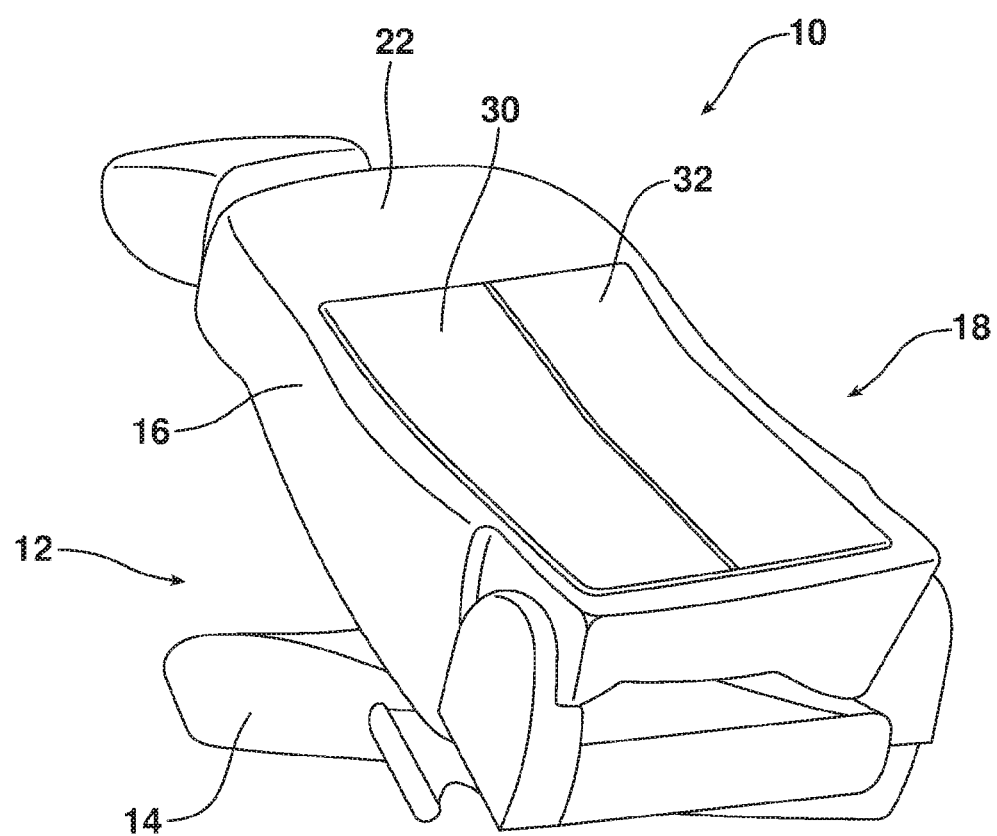
FIG. 1a illustrates the tipping of the car seat forward into a baby changing position.
Figure 1B:
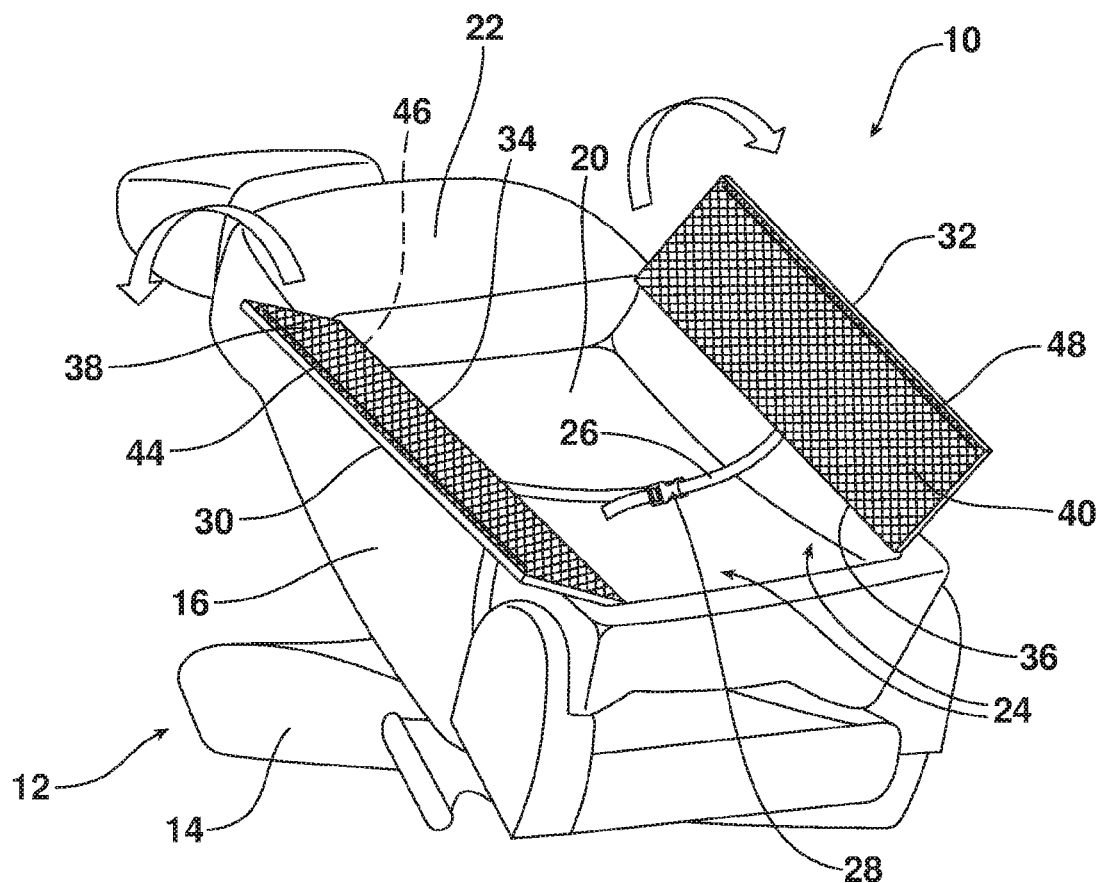
FIG. 1b is a perspective view illustrating the opening of the two panels of the cover to reveal a cavity in the rear face of the seat back and a restraining strap for holding the baby in position during the changing process.
Figure 1C:
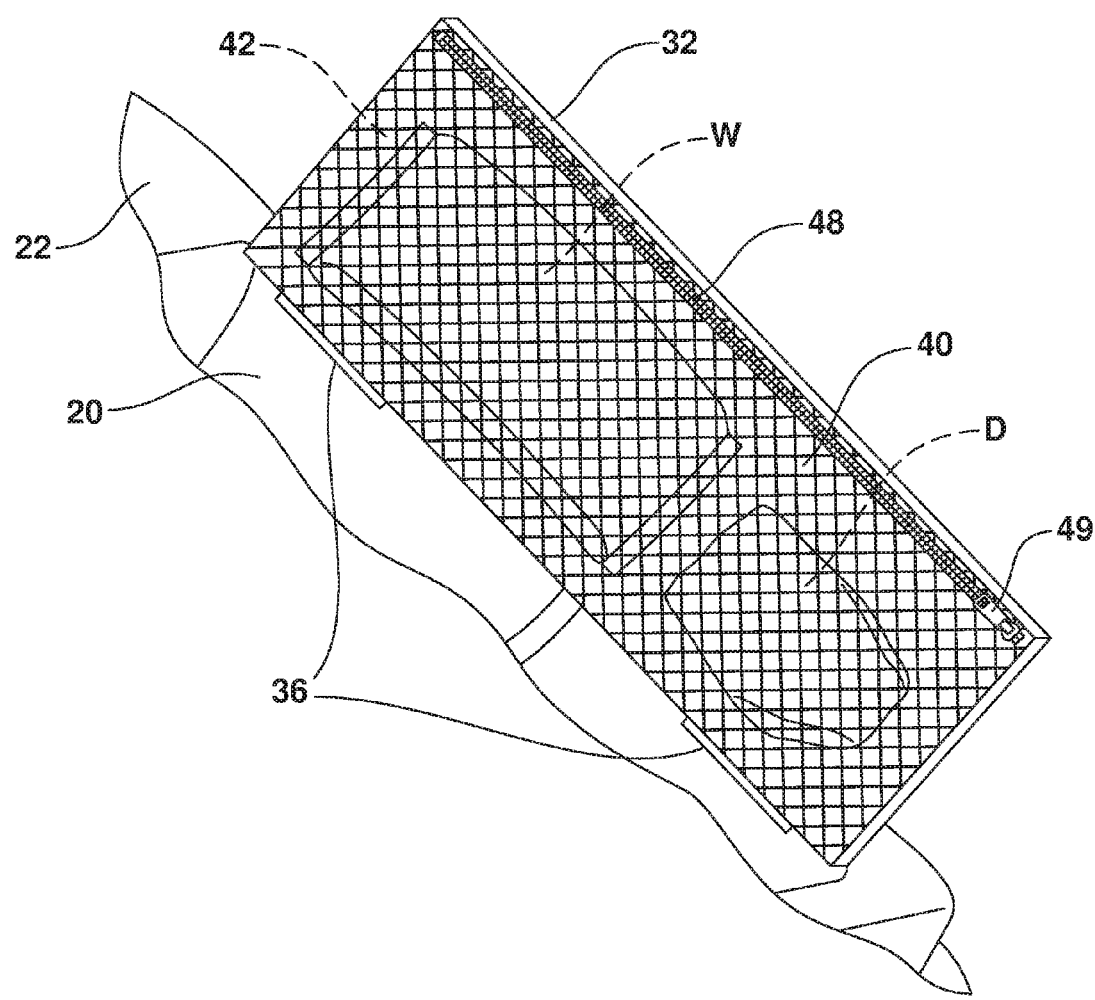
FIG. 1c is a detailed view of one of the cover panels illustrating the net made of elastic material which forms an expandable storage pocket for holding baby changing items such as diapers and wipes.
Figure 1D:
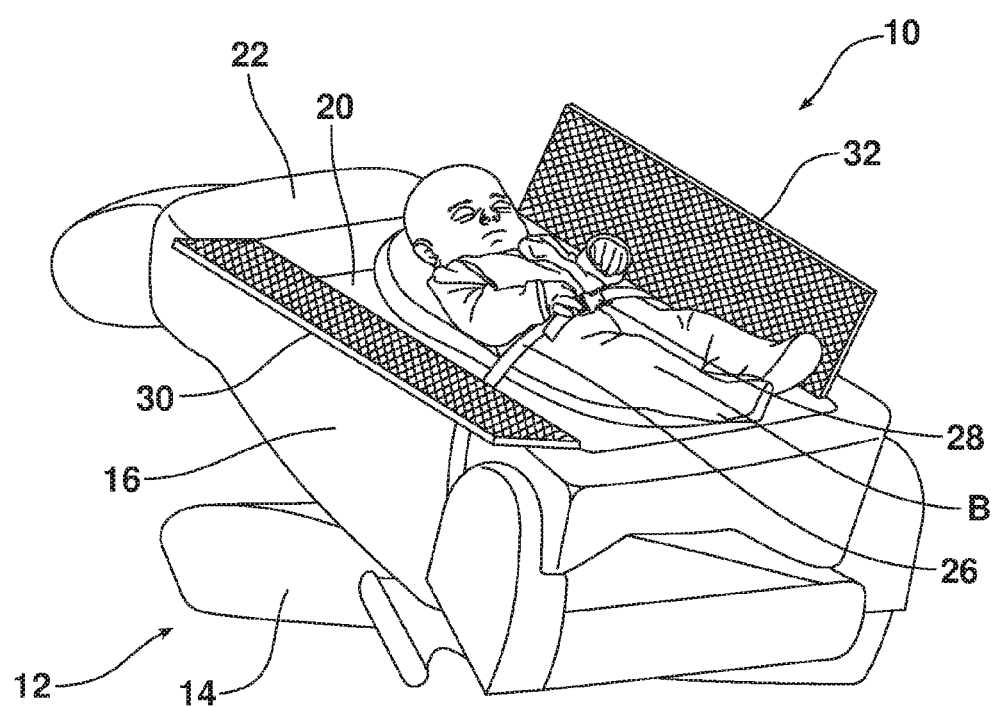
FIG. 1d illustrates a baby on the baby changing station in a changing position.
Figure 2:
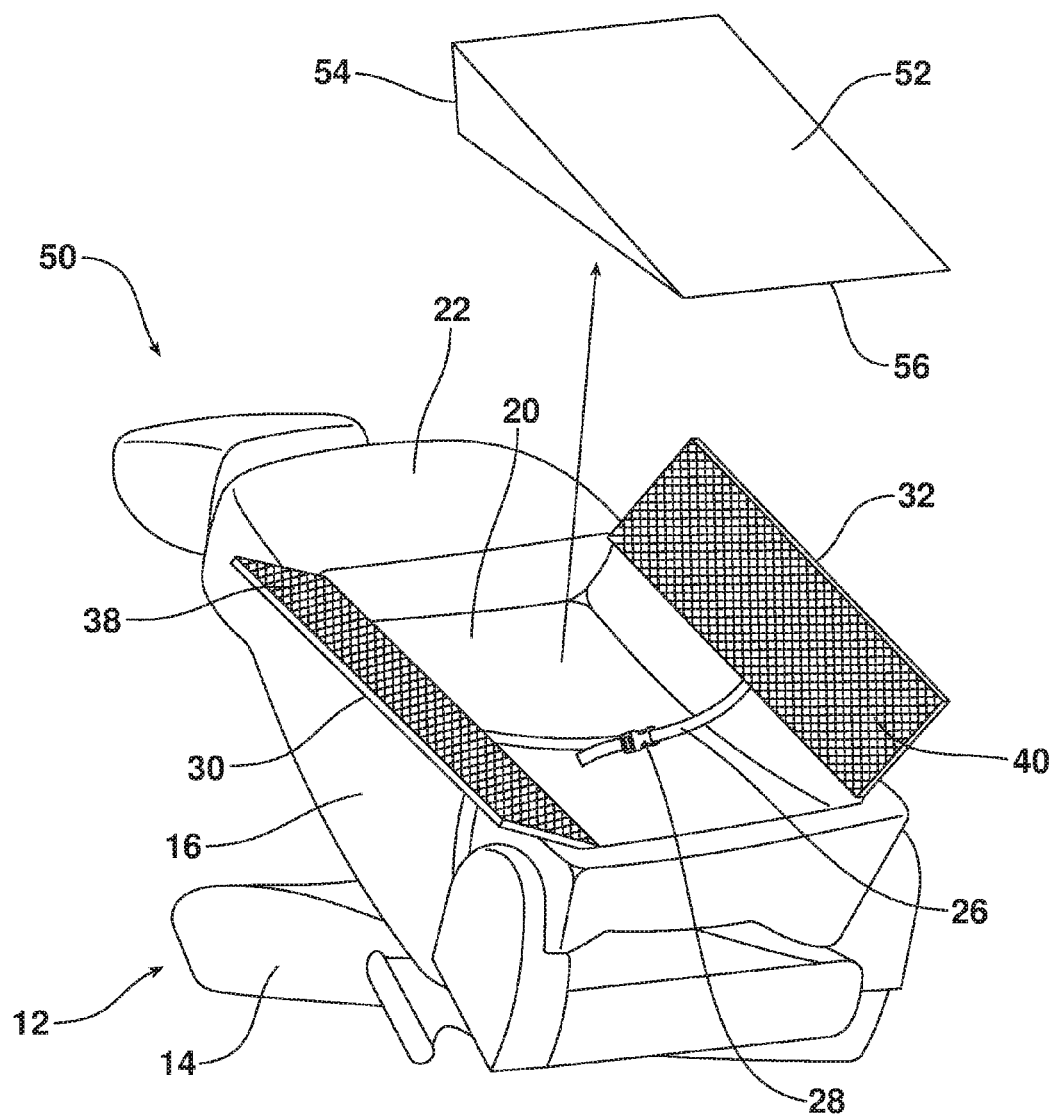
FIG. 2 is a partially exploded, perspective view of an alternative embodiment of the baby changing station including a wedge cushion that nests within the cavity in a rear face of the seat back when not in use.

Reference is now made to FIGS. 1-1*d* illustrating a first embodiment of baby changing station 10 for a motor vehicle. The baby changing station 10 includes a car seat 12 having a seat bottom 14 and a displaceable seat back 16. As illustrated in FIG. 1, the seat back 16 is in the upright driving position. As illustrated in FIG. 2, the seat back 16 has been pivoted forward into a baby changing position.

As illustrated in FIGS. 1-1*b*, a cover, generally designated by reference numeral 18 is carried on the seat back 16. That cover 18 is displaceable between a first or closed position (shown in FIGS. 1 and 1*a*) covering and concealing a cavity 20 provided in a rear face 22 of the seat back and a second, open position opening that cavity (see FIG. 1*b*). As illustrated in FIG. 1*b*, a storage net 24 is carried on a first face of the cover 18. Further, a baby restraining strap is carried on the seat back 16. As illustrated, the restraining strap 26 is connected at both ends to the seat back 16 and extends across the cavity 20. A snap-lock buckle 28, of a type known in the art, allows one to open the restraining strap 26 and secure a baby in a baby changing position in the cavity 20 as illustrated in FIG. 1*d*.

As illustrated in FIGS. 1-1*d*, the cover 18 comprises a first panel 30 and a second panel 32. The first panel 30 is connected to the seat back 16 by a first hinge 34 adjacent a first side of the seat back 16. In contrast, the second panel 32 is connected by a second hinge 36 adjacent a second side of the seat back 16. Thus, the panels 30, 32 open in opposed directions (note action arrows in FIG. 1*b*) and when opened, form extended sidewalls projecting from the seat back 16 at opposing sides of the cavity 20.

As illustrated in FIGS. 1*b* and 1*c*, the storage net 24 comprises a first net 38 carried on the first panel 30 and a second net 40 carried on the second panel 32. The first and second nets 38, 40 may both be made from a stretchable elastic material. Consequently the first net 38 forms a first expandable storage pocket 42 accessible through a first access opening 44 in the first net and the second net 40 forms a second expandable storage pocket 46 accessible through a second access opening 48 in the second net. Either or both openings 44, 48 may be closed by a zipper 49 if desired as shown in FIG. 1*c*. FIG. 1*d* illustrates in detail how baby changing items such as a clean diaper D and wipes W may be conveniently stored in the second pocket 46 where they may be easily reached and conveniently accessed during the baby changing operation. As should be appreciated from viewing FIG. 1*d*, the restraining strap 26 holds the baby B safely in place in the cavity 20 during baby changing so that the care provider may use both hands to access the new diaper D, wipes W and complete the diaper changing operation.

Following the changing of the baby, restraining strap buckle 28 may be opened and the baby B may be returned to the baby car seat (not shown). The wipes W may be returned to the pocket 42 and the two panels 30, 32 of the cover 18 may be closed so as to fully conceal the cavity 20 and all baby changing items held in the pockets 42, 46 from view. The seat back 16 may then be returned to the upright driving position illustrated in FIG. 1. A latching mechanism such as cooperating magnets or other means (not shown) may be provided to hold the cover 18 and, more particularly, the panels 30, 32 in the first or closed position. As should be appreciated, these panels 30, 32 provide an aesthetically pleasing appearance when closed.

Figure 2A:
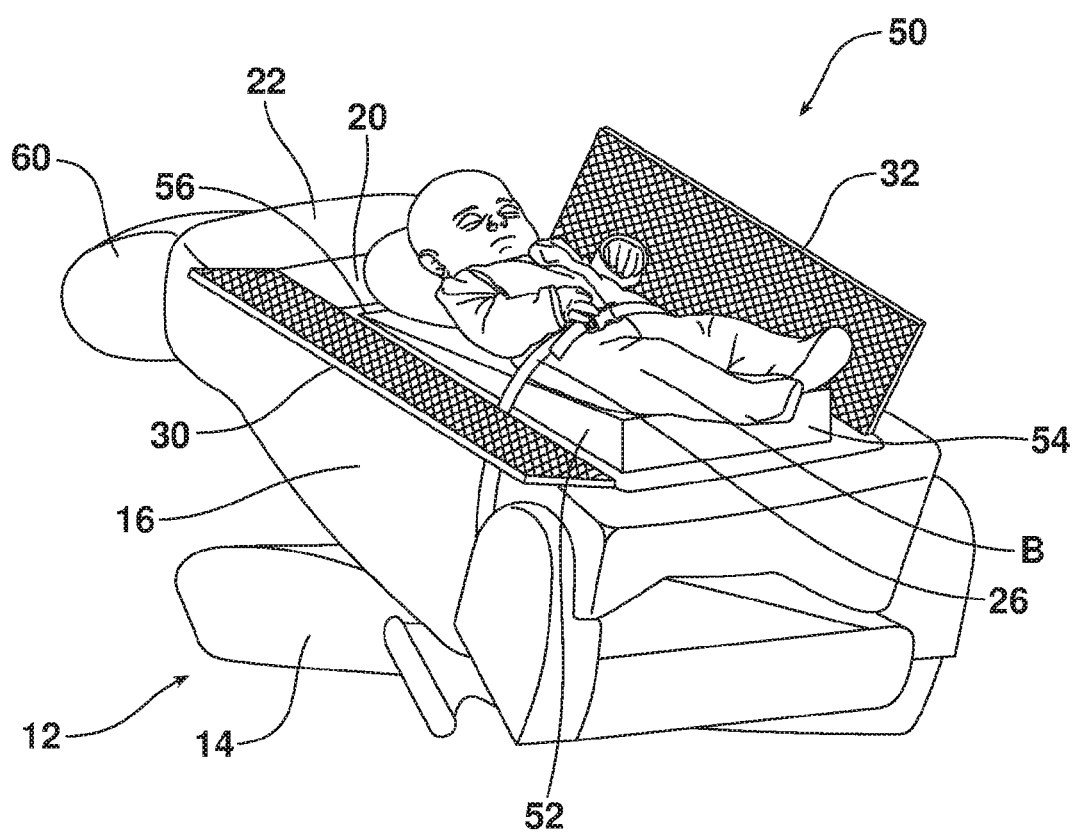
FIG. 2a is a perspective view of the second embodiment illustrated in FIG. 2 wherein the wedge cushion has been removed from the cavity and reoriented to support the baby under the restraining strap in a more horizontal position for changing.

Reference is now made to FIGS. 2 and 2*a* illustrating an alternative embodiment of baby changing station 50. The baby changing station 50 includes various components corresponding to those of the first embodiment of baby changing station 10 illustrated in FIGS. 1-1*d* and those components are identified by identical reference numbers. The description of the operation of those components with respect to the embodiment of baby changing station 10 illustrated in FIGS. 1-1*d* applies equally to the embodiment of baby changing station 50 illustrated in FIGS. 2 and 2*a* and will not be repeated for the purpose of brevity.

Significantly, the baby changing station 50 includes a wedge cushion 52 made of a soft, spongy material such as memory foam. As illustrated, the wedge cushion 52 includes a tall end 54 and a short end 56. The wedge cushion 52 is sized and shaped to be fully received and nest within the cavity 20 provided in the rear face 22 of the seat back 16. Thus, it should be appreciated that the wedge cushion 52 may be stored and concealed within the cavity 20 behind the cover 18 when the cover panels 30 and 32 are closed.

When one wishes to change the diaper of a baby, the cover panels 30, 32 are opened and the wedge cushion 52 is removed from the cavity 20 and turned 180 degrees so that the tall end 54 is provided adjacent the bottom end 58 of the seat back 16 and the short end 56 is oriented toward the head rest 60. Thus, it should be appreciated that the slope of the wedge cushion 52 is oriented opposite to the slope of the seat back 16 in the baby changing position illustrated in FIG. 2*a*. Consequently, when the baby B is restrained on the wedge cushion 52 with the restraining strap 26, the baby is held in a more horizontal position than possible if the wedge cushion 52 is not so oriented.

After changing the baby, the wedge cushion 52 may be turned and reoriented so that it will again nest in the cavity 20 as illustrated in FIG. 2 and the cover panels 30, 32 may be closed to conceal the wedge cushion therein.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A baby changing station for a motor vehicle, comprising:
    a car seat including a seat bottom and a seat back, wherein said seat back is pivotable between an upright driving position and a baby changing position;
    a cavity in a rear face of said seat back;
    a restraining strap carried on said seat back, said restraining strap extending across said cavity for use in the baby changing position;
    a cover including a first panel and a second panel, said cover carried on said seat back and displaceable between a first position covering and concealing said cavity and a second position opening said cavity, wherein said first panel is connected to said seat back by a first hinge and said second panel is connected to said seat back by a second hinge, and wherein said first hinge is adjacent a first side of said seat back and said second hinge is adjacent a second side of said seat back so that said panels open in opposed directions and when opened, form extended sidewalls projecting from said seat back at opposing sides of said cavity; and a storage net carried on a first face of said cover, wherein said storage net comprises a first net carried on said first panel and a second net carried on said second panel, wherein said first net and said second net are both made from elastic material, said first net forms a first expandable storage pocket accessible through a first access opening and said second net forms a second expandable storage pocket accessible through a second access opening, and wherein said first face is oriented toward said cavity when said cover is in said first position whereby said first net and said second net are both concealed in said cavity when said cover is in said first position.

2. The baby changing station of claim 1, further including a wedge cushion sized and shaped to nest in said cavity.

3. The baby changing station of claim 2, wherein said car seat is a front passenger seat of said motor vehicle.

4. The baby changing station of claim 1, wherein said car seat is a front passenger seat of said motor vehicle.

* * * * *